US006251513B1

(12) United States Patent
Rector et al.

(10) Patent No.: US 6,251,513 B1
(45) Date of Patent: Jun. 26, 2001

(54) POLYMER COMPOSITES FOR OVERVOLTAGE PROTECTION

(75) Inventors: Louis Rector, Grays Lake, IL (US); Hugh M. Hyatt, Bothell, WA (US)

(73) Assignee: Littlefuse, Inc., Des Plaines, IL (US)

( * ) Notice: Subject to any disclaimer, the term of this patent is extended or adjusted under 35 U.S.C. 154(b) by 0 days.

(21) Appl. No.: 09/136,507

(22) Filed: Aug. 19, 1998

Related U.S. Application Data

(60) Provisional application No. 60/064,963, filed on Nov. 8, 1997.

(51) Int. Cl.[7] ........................................................ B23B 5/16

(52) U.S. Cl. .......................... 428/323; 428/328; 428/331; 524/80; 524/495; 524/781; 524/783; 524/784; 524/785; 524/786; 524/787; 524/789; 524/847; 524/859

(58) Field of Search .................................... 428/323, 328, 428/331; 524/80, 495, 781, 783, 784, 785, 786, 787, 789, 847, 858

(56) References Cited

U.S. PATENT DOCUMENTS

| | | | |
|---|---|---|---|
| 2,273,704 | 2/1942 | Grisdale . | |
| 3,685,026 | 8/1972 | Wakabayashi et al. . | |
| 3,685,028 | 8/1972 | Wakabayashi et al. . | |
| 4,045,712 | 8/1977 | De Tommasi . | |
| 4,252,692 | 2/1981 | Taylor et al. . | |
| 4,331,948 | 5/1982 | Malinaric et al. . | |
| 4,359,414 | 11/1982 | Mastrangelo . | |
| 4,726,991 | 2/1988 | Hyatt et al. . | |
| 4,977,357 | 12/1990 | Shrier . | |
| 4,992,333 | 2/1991 | Hyatt . | |
| 5,068,634 | 11/1991 | Shrier . | |
| 5,099,380 | 3/1992 | Childers et al. . | |
| 5,142,263 | 8/1992 | Childers et al. . | |
| 5,183,698 | 2/1993 | Stephenson et al. . | |
| 5,189,387 | 2/1993 | Childers et al. . | |
| 5,246,388 | 9/1993 | Collins et al. . | |
| 5,248,517 | 9/1993 | Shrier et al. . | |
| 5,260,848 | 11/1993 | Childers . | |
| 5,262,754 | 11/1993 | Collins . | |
| 5,278,535 | 1/1994 | Xu et al. . | |
| 5,290,821 * | 3/1994 | Sakurai et al. | 5521/82 |
| 5,294,374 | 3/1994 | Martinez et al. . | |
| 5,340,641 | 8/1994 | Xu . | |
| 5,384,190 * | 1/1995 | Kaburaki | 428/323 |
| 5,393,597 | 2/1995 | Childers et al. . | |
| 5,476,714 | 12/1995 | Hyatt . | |
| 5,669,381 | 9/1997 | Hyatt . | |
| 5,781,395 | 7/1998 | Hyatt . | |
| 5,807,509 | 9/1998 | Shrier et al. . | |

FOREIGN PATENT DOCUMENTS

WO 97/21230 6/1997 (WO) .

OTHER PUBLICATIONS

European Search Report–EP Application No. 99300315–Apr. 22, 1999.

International Search Report–International Application No. PCT/US98/23493–Mar. 3, 1999.

* cited by examiner

*Primary Examiner*—Hoa T. Le
(74) *Attorney, Agent, or Firm*—Bell, Boyd & Lloyd LLC

(57) ABSTRACT

A composition and devices utilizing these compositions for providing protection against electrical overstress including a matrix formed of a mixture of an insulating binder, conductive particles having an average particle size of less than 10 microns, and semiconductive particles having an average particle size of less than 10 microns. The compositions exhibit improved clamping voltages in a range of about 30 volts to greater than 2,000 volts.

27 Claims, 2 Drawing Sheets

POLYMER COMPOSITES FOR OVERVOLTAGE PROTECTION

CROSS-REFERENCE TO RELATED APPLICATIONS

This application claims the benefit of U.S. provisional patent application No. 60/064,963 filed on Nov. 8, 1997.

TECHNICAL FIELD

The present invention generally relates to the use of polymer composite materials for the protection of electronic components against electrical overstress (EOS) transients.

BACKGROUND OF THE INVENTION

There is an increased demand for electrical components which can protect electronic circuits from EOS transients which produce high electric fields and usually high peak powers capable of destroying circuits or the highly sensitive electrical components in the circuits, rendering the circuits and the components non-functional, either temporarily or permanently. The EOS transient can include transient voltage or current conditions capable of interrupting circuit operation or destroying the circuit outright. Particularly, EOS transients may arise, for example, from an electromagnetic pulse, an electrostatic discharge, lightening, or be induced by the operation of other electronic or electrical components. Such transients may rise to their maximum amplitudes in microsecond to subnanosecond timeframe and may be repetitive in nature. A typical waveform of an electrical overstress transient is illustrated in FIG. 1. The peak amplitude of the electrostatic discharge (ESD) transient wave may exceed 25,000 volts with currents of more than 100 amperes. There exist several standards which define the waveform of the EOS transient. These include IEC 1000-4-2, ANSI guidelines on ESD (ANSI C63.16), DO-160, and FAA-20-136. There also exist military standards, such as MIL STD 461/461 and MIL STD 883 part 3015.

Materials for the protection against EOS transients (EOS materials) are designed to respond essentially instantaneously (i.e., ideally before the transient wave reaches its peak) to reduce the transmitted voltage to a much lower value and clamp the voltage at the lower value for the duration of the EOS transient. EOS materials are characterized by high electrical resistance values at low or normal operating voltages and currents. In response to an EOS transient, the material switches essentially instantaneously to a low electrical resistance value. When the EOS threat has been mitigated these materials return to their high resistance value. These materials are capable of repeated switching between the high and low resistance states, allowing circuit protection against multiple EOS events. EOS materials are also capable of recovering essentially instantaneously to their original high resistance value upon termination of the EOS transient. For purposes of this application, the high resistance state will be referred to as the "off-state" and the low resistance state will be referred to as the "on-state." These materials which are subject of the claims herein have withstood thousands of ESD events and recovered to desired off-states after providing protection from each of the individual ESD events.

FIG. 2 illustrates a typical electrical resistance versus d.c. voltage relationship for EOS materials. Circuit components including EOS materials can shunt a portion of the excessive voltage or current due to the EOS transient to ground, thus, protecting the electrical circuit and its components. The major portion of the threat transient is reflected back towards the source of the threat. The reflected wave is either attenuated by the source, radiated away, or re-directed back to the surge protection device which responds with each return pulse until the threat energy is reduced to safe levels.

U.S. Pat. No. 2,273,704, issued to Grisdale, discloses granular composites which exhibit non-linear current voltage relationships. These mixtures are comprised of granules of conductive and semiconductive granules that are coated with a thin insulative layer and are compressed and bonded together to provide a coherent body.

U.S. Pat. No. 2,796,505, issued to Bocciarelli, discloses a non-linear voltage regulating element. The element is comprised of conductor particles having insulative oxide surface coatings that are bound in a matrix. The particles are irregular in shape and make point contact with one another.

U.S. Pat. No. 4,726,991, issued to Hyatt et al., discloses an EOS protection material comprised of a mixture of conductive and semiconductive particles, all of whose surfaces are coated with an insulative oxide film. These particles are bound together in an insulative binder. The coated particles are preferably in point contact with each other and conduct preferentially in a quantum mechanical tunneling mode.

U.S. Pat. No. 5,476,714, issued to Hyatt, discloses EOS composite materials comprised of mixtures of conductor and semiconductor particles in the 10 to 100 micron range with a minimum proportion of 100 angstrom range insulative particles, bonded together in a insulative binder. This invention includes a grading of particle sizes such that the composition causes the particles to take a preferential relationship to each other.

U.S. Pat. No. 5,260,848, issued to Childers, discloses foldback switching materials which provide protection from transient overvoltages. These materials are comprised of mixtures of conductive particles in the 10 to 200 micron range. Semiconductor and insulative particles are also used in this invention. The spacing between conductive particles is at least 1000 angstroms.

Examples of prior EOS polymer composite materials are also disclosed in U.S. Pat. Nos. 4,331,948, 4,726,991, 4,977,357,4,992,333, 5,142,263, 5,189,387, 5,294,374, 5,476,714, 5,669,381, and 5,781,395.

SUMMARY OF THE INVENTION

It is an object of the present invention to provide a polymer composite material which provides a high electrical resistance to normal operating voltage values but in response to an EOS transient switches to a low electrical resistance and clamps the EOS transient voltage to a low level for the duration of the EOS transient.

It is another object of the present invention to provide an EOS composition comprising a matrix formed of a mixture of an insulating binder, conductive particles having an average particle size less than 10 microns, and semiconductive particles having an average particle size less than 10 microns, and optionally, insulating particles in the 200–1000 angstrom size range.

It is a final object of the present invention to provide an EOS composition which provides a clamping voltage in the range of 25–100 volts. Clamping voltages are dependent upon both material composition and device geometry. Voltage clamping reported above relates primarily to surge arrestors of small size with electrode spacing from 0.0015 inches to 0.0500 inches typically. Increasing the gap between electrodes provides an additional control on the clamping voltage. Devices using larger electrode gaps, electrode areas and higher material volumes will provide higher clamping voltages. It is possible to design surge arrestors with clamping voltages as great as 2 kV or higher.

Other advantages and aspects of the present invention will become apparent upon reading the following description of the drawings and detailed description of the invention.

DETAILED DESCRIPTION OF THE INVENTION

Figure 1:
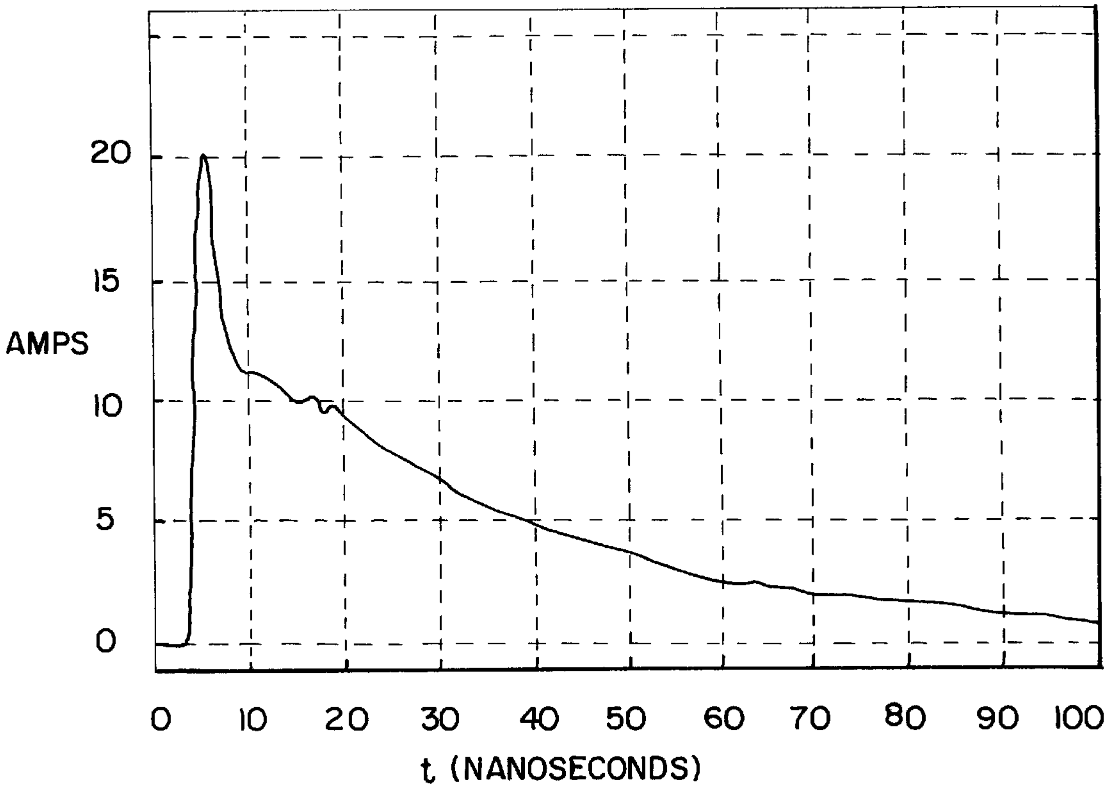
FIG. 1 graphically illustrates a typical current waveform of an EOS transient.
Figure 2:
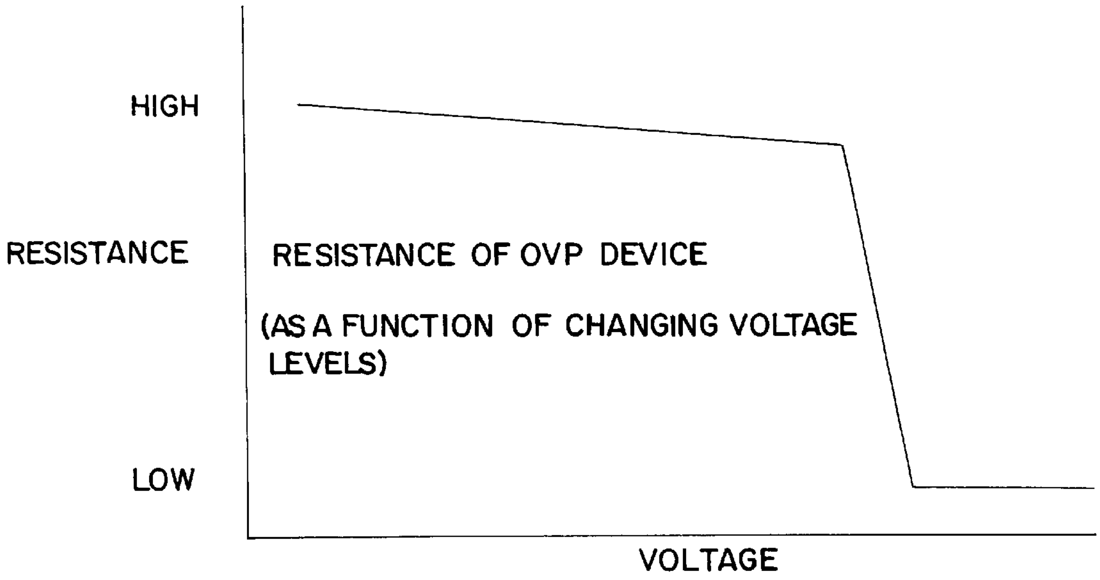
FIG. 2 graphically illustrates the electrical resistance versus d.c. voltage relationship of typical EOS materials.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

Figure 3:
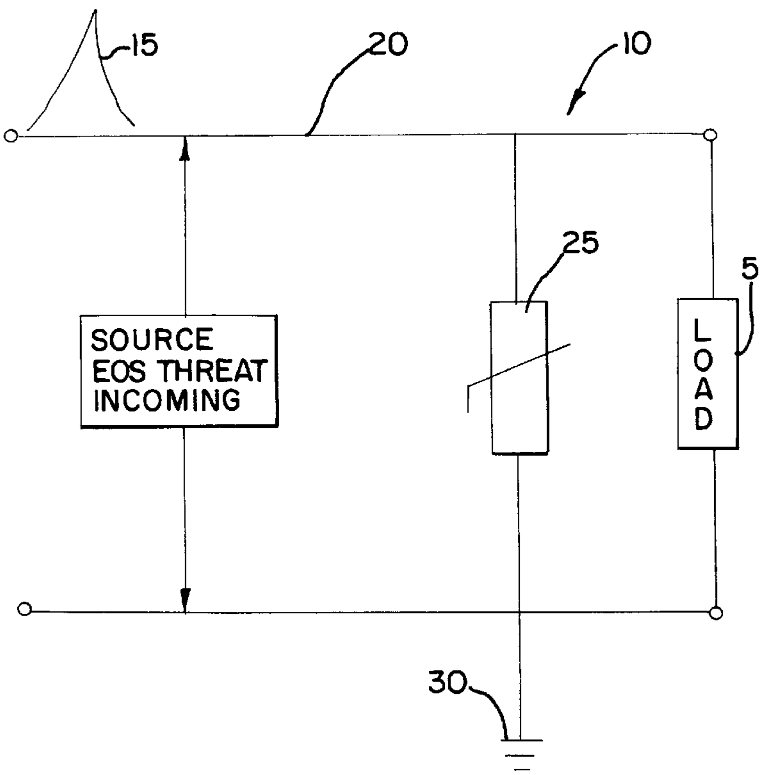
FIG. 3 illustrates a typical electronic circuit including a device having an EOS composition according to the present invention.

With reference to FIG. 3, electrical devices including compositions made according to the present invention provide electrical circuits and circuitry components with protection against incoming EOS transients. The circuit load 5 in FIG. 3 normally operates at voltages less than a predetermined voltage $V_n$. EOS transient threats of more than two and three times the predetermined operating voltage $V_n$ with sufficient duration can damage the circuit and the circuit components. Typically, EOS threats exceed the predetermined operating voltage by tens, hundreds, or even thousands of times the voltage seen in normal operation. In FIG. 3, an EOS transient voltage 15 is shown entering the circuit 10 on electronic line 20. As previously mentioned the EOS transient voltage can result from an electromagnetic pulse, an electrostatic discharge or lightning. Upon application of the EOS transient voltage 15, the electrical overstress protection device 25 switches from the high resistance off-state to a low resistance on-state, thus clamping the EOS transient voltage 15 to a safe, low value and shunting a portion of the threat electrical current from the electronic line 20 to the system ground 30. The major portion of the threat current is reflected back towards the source of the threat.

The EOS switching material of the present invention utilizes small particle size conductive and semiconductive particles, and optionally insulating particles, dispersed in an insulating binder using standard mixing techniques. The insulating binder is chosen to have a high dielectric breakdown strength, a high electrical resistivity and high tracking resistance. The switching characteristics of the composite material are determined by the nature of the conductive, semiconductive, and insulative particles, the particle size and size distribution, and the interparticle spacing. The interparticle spacing depends upon the percent loading of the conductive, semiconductive, and insulative particles and on their size and size distribution. In the compositions of the present invention, interparticle spacing will be generally greater than 1,000 angstroms. Additionally, the insulating binder must provide and maintain sufficient interparticle spacing between the conductive and semiconductive particles to provide a high off-state resistance. The desired off-state resistance is also affected by the resistivity and dielectic strength of the insulating binder. Generally speaking the insulating binder material should have a volume conductivity of at most $10^{-6}$ (ohm-cm)$^{-1}$.

Suitable insulative binders for use in the present invention include thermoset polymers, thermoplastic polymers, elastomers, rubbers, or polymer blends. The polymers may be cross-linked to promote material strength. Likewise, elastomers may be vulcanized to increase material strength. In a preferred embodiment, the insulative binder comprises a silicone rubber resin manufactured by Dow Corning STI and marketed under the tradename Q4-2901. This silicone resin is cross-linked with a peroxide curing agent; for example, 2,5-bis-(t-butylperoxy)-2,5-dimethyl-1-3-hexyne, available from Aldrich Chemical. The choice of the peroxide curing agent is partially determined by desired cure times and temperatures. Nearly any binder will be useful as long as the material does not preferentially track in the presence of high interparticle current densities. In another preferred embodiment, the insulative binder comprises silicone resin and is manufactured by General Electric and marketed under the tradename SLA7401-D1.

The conductive particles preferred for use in the present invention have bulk conductivities of greater than 10 (ohm-cm)$^{-1}$ and especially greater than 100 (ohm-cm)$^{-1}$. The conductive powders preferably have a maximum average particle size less than 10 microns. Preferably 95% of the conductive particles have diameters no larger than 20 microns, more preferably 100% of the particles are less than 10 microns in diameter. Conductive particles with average particle sizes in the submicron range are also preferred. For example, conductive materials with average particle sizes in the 1 micron down to nanometer size range are useful. Among the conductive particles which are suitable for use in the present invention are nickel, copper, aluminum, carbon black, graphite, silver, gold, zinc, iron, stainless steel, tin, brass, and metal alloys. In addition intrinsically conducting polymer powders, such as polypyrrole or polyaniline may also be employed, as long as they exhibit stable electrical properties.

In a preferred embodiment, the conductive particles are nickel manufactured by Novamet and marketed under the tradename Ni-4sp-10 and have an average particle size in the range of 4–8 microns. In another preferred embodiment, the conductive particles comprise aluminum and have an average particle size in the range of 1–5 microns.

The semiconductive particles preferred for use in the present invention have an average particle size less than 5 microns and bulk conductivities in the range of 10 to $10^{-6}$ (ohm-cm)$^{-1}$. However, in order to maximize particle packing density and obtain optimum clamping voltages and switching characteristics, the average particle size of the semiconductive particles is preferably in a range of about 3 to about 5 microns, or even less than 1 micron. For example, semiconductive particle sizes down to the 100 nanometer range and less are also suitable for use in the present invention. The preferred semiconductive material is silicon carbide. However, the following semiconductive particle materials can also be used in the present invention: oxides of bismuth, copper, zinc, calcium, vanadium, iron, magnesium, calcium and titanium; carbides of silicon, aluminum, chromium, titanium, molybdenum, beryllium, boron, tungsten and vanadium; sulfides of cadmium, zinc, lead, molybdenum, and silver; nitrides such as boron nitride, silicon nitride and aluminum nitride; barium titanate and iron titanate; suicides of molybdenum and chromium; and borides of chromium, molybdenum, niobium and tungsten.

In a preferred embodiment the semiconductive particles are silicon carbide manufactured by Agsco, #1200 grit, having an average particle size of approximately 3 microns, or silicon carbide manufactured by Norton, #10,000 grit, having an average particle size of approximately 0.3 microns. In another preferred embodiment the compositions of the present invention comprise semiconductive particles formed from mixtures of different semiconductive materials; e.g., silicon carbide and at least one of the following materials: barium titanate, magnesium oxide, zinc oxide, and boron nitride.

In the EOS compositions according to the present invention, the insulating binder comprises from about 20 to about 60%, and preferably from about 25 to about 50%, by volume of the total composition. The conductive particles may comprise from about 5 to about 50%, and preferably from about 10 to about 45%, by volume of the total composition. The semiconductive particles may comprise from about 2 to about 60%, and preferably from about 25 to about 50%, by volume of the total composition.

According to another embodiment of the present invention, the EOS compositions further comprise insulative particles having an average particle size in a range of about 200 to about 1000 angstroms and bulk conductivities of less than $10^{-6}$ (ohm-cm)$^{-1}$. An example of a suitable insulating particle is titanium dioxide having an average particle size from about 300 to about 400 angstroms produced by Nanophase Technologies. Other examples of suitable insulating particles include, oxides of iron, aluminum, zinc, titanium and copper and clay such as montmorillonite type produced by Nanocor, Inc. and marketed under the Nanomer tradename. The insulating particles, if employed in the composition, are preferably present in an amount from about 1 to about 15%, by volume of the total composition.

Through the use of a suitable insulating binder and conductive, semiconductive and insulating particles having the preferred particle sizes and volume percentages, compositions of the present invention generally can be tailored to provide a range of clamping voltages from about 30 volts to greater than 2,000 volts. Preferred embodiments of the present invention for circuit board level protection exhibit clamping voltages in a range of 100–200 volts, preferably less than 100 volts, more preferably less than 50 volts, and especially exhibit clamping voltages in a range of about 25 to about 50 volts.

Figure 4A:
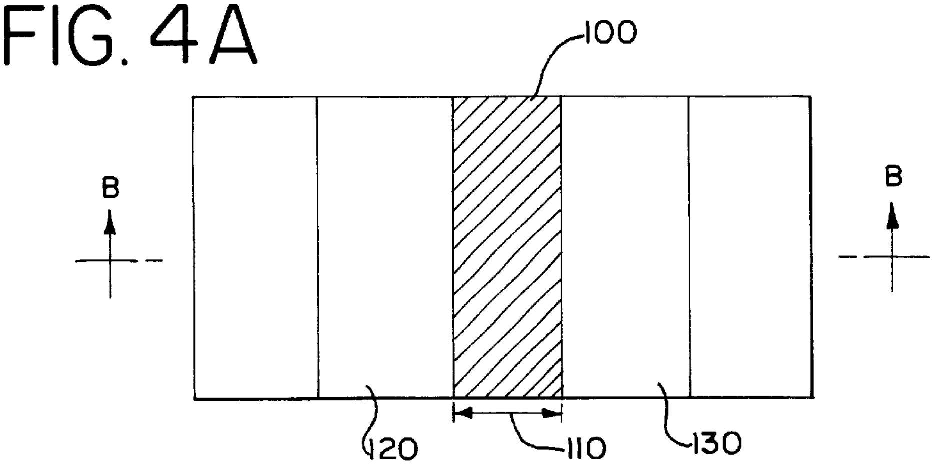
FIG. 4A illustrates a top view of the surface-mount electrical device configuration used to test the electrical properties of the EOS composition according to the present invention.
Figure 4B:
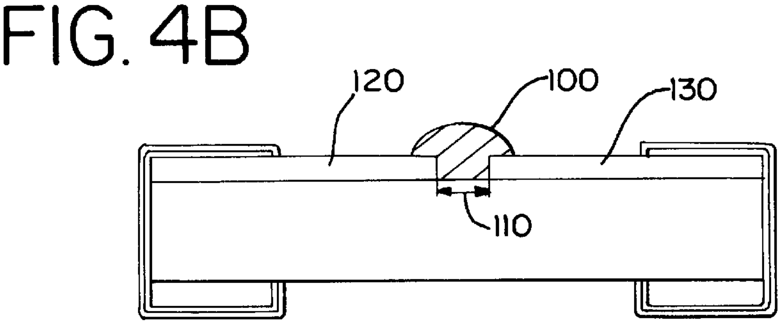
FIG. 4B is a cross-sectional view taken along lines B—B of the electrical device configuration illustrated in FIG. 4A.

A number of compositions have been prepared by mixing the components in a polymer compounding unit such as a Brabender or a Haake compounding unit. Referring to FIG. 4, the compositions 100 were laminated into an electrode gap region 110 between electrodes 120, 130 and subsequently cured under heat and pressure. The response of the materials to: (1) a transmission line voltage pulse (TLP) approximately 65 nanoseconds in duration; and, (2) an IEC 10004-2 EOS current transient generated by a KeyTek Minizapper (MZ) have been measured. The package stray capacitance and inductance are minimized in devices constructed from these materials. Various gap widths were tested. The compositions and responses are set forth in Table 1.

| SAMPLE NOTEBOOK NUMBER | 123s47 | 123s48 | 123s49 | 123s51 | 123s53 | 123s54 | 123s55 | 123s56 |
|---|---|---|---|---|---|---|---|---|
| FORMULATION (Compositions Expressed in Volume Percentages) | | | | | | | | |
| Nickel, Type 4SP-10 (Novamet, 4–8 micron range) | 15.0 | 15.0 | 30.0 | 30.0 | 15.0 | 30.0 | 30.0 | 31.25 |
| Nickel, 0.1 micron range (Conducting Materials Corporation) | | | | | | | | |
| Aluminum, 1–5 micron range (Atlantic Equipment Engineers) | | | | | | | | |
| Nickel, Type 110, 1 micron range (Novamet) | | | | | | | | |
| Silicon Carbide (Norton, #10,000 grit) | | 35.0 | | 10.0 | 20.0 | 10.0 | 15.0 | 10.42 |
| Silicon Carbide (Agsco, #1200 grit) | 20.0 | | 25.0 | | | | | |
| Barium Titanate, 0.5–3 micron range (Atlantic Equipment Engineers) | | | | | | | | |
| Titanium Dioxide, 35 nm range (Nanophase Technologies) | | | | | | | | |
| Magnesium Oxide, 1–5 micron range (Atlantic Equipment Engineers) | 20.0 | 5.0 | | | | 20.0 | | 20.83 |
| Zinc Oxide, 1–5 micron range (Atlantic Equipment Engineers) | | | | | | | 15.0 | |
| Boron Nitride, 5–10 micron range (Combat) | | | | | 20.0 | | | |
| Binder: | | | | | | | | |
| STI Q4-2901 (Dow Corning STI) | 45.0 | 45.0 | | | 45.0 | 40.0 | 40.0 | 37.6 |
| GE SLA7401-D1 (General Electric) | | | 45.0 | 60.0 | | | | |
| ELECTRICAL PERFORMANCE | | | | | | | | |
| Electrode Gap (mil) | 2 | 2 | 2 | 2 | 2 | 2 | 2 | 2 |
| Device Resistance (ohm) | 4.7E + 11 | 2.0E + 12 | 4.8E + 12 | >333E + 12 | >333E + 12 | 7.5E + 12 | 5.2E + 12 | 4.6E + 12 |
| TLP RESULTS (2 kV Overstress Pulse) Clamp voltage (V) (from leading edge of pulse) | | | | | | | | |
| 25 ns | 79 | 76 | 70 | 189 | 82 | 70 | 107 | 88 |
| 50 ns | 77 | 82 | 69 | 127 | 76 | 63 | 94 | 79 |

-continued

| | | | | | | | | |
|---|---|---|---|---|---|---|---|---|
| MZ RESULTS (8 kV Overstress Pulse) Clamp voltage (V) (from leading edge of pulse) | | | | | | | | |
| 25 ns | 55 | 69 | 65 | 78 | 68 | 87 | 50 | 68 |
| 50 ns | 52 | 63 | 57 | 67 | 54 | 71 | 45 | 61 |
| 100 ns | 38 | 53 | 46 | 52 | 48 | 56 | 31 | 50 |

| SAMPLE NOTEBOOK NUMBER | 123s57 | 123s58 | 123s59 | 123s60 | 59s1146 | 109s25 | 109s52 | 109s12 |
|---|---|---|---|---|---|---|---|---|
| FORMULATION (Compositions Expressed in Volume Percentages) | | | | | | | | |
| Nickel, Type 4SP-10 (Novamet, 4–8 micron range) | 33.25 | 33.15 | 32.5 | 30.0 | 25.0 | 15.0 | | 30.0 |
| Nickel, 0.1 micron range (Conducting Materials Corporation) | | | | | | | 15.0 | |
| Aluminum, 1–5 micron range (Atlantic Equipment Engineers) | | | | | | | | |
| Nickel, Type 110, 1 micron range (Novamet) | | | | | | | | |
| Silicon Carbide (Norton, #10,000 grit) | 10.42 | 10.42 | 15.0 | 5.0 | | 40.0 | 40.0 | |
| Silicon Carbide (Agsco, #1200 grit) | | | | | | | | |
| Barium Titanate, 0.5–3 micron range (Atlantic Equipment Engineers) | | | | | 25.0 | | | 25.0 |
| Titanium Dioxide, 35 nm range (Nanophase Technologies) | | | | | | | | 10.0 |
| Magnesium Oxide, 1–5 micron range (Atlantic Equipment Engineers) | 20.83 | 20.83 | | | | | | |
| Zinc Oxide, 1–5 micron range (Atlantic Equipment Engineers) | | | 15.0 | 25.0 | | | | |
| Boron Nitride, 5–10 micron range (Combat) | | | | | | | | |
| Binder: | | | | | | | | |
| STI Q4-2901 (Dow Corning STI) | 35.6 | 35.6 | 37.5 | 40.0 | 50.0 | 45.0 | 45.0 | 35.0 |
| GE SLA7401-D1 (General Electric) | | | | | | | | |
| ELECTRICAL PERFORMANCE | | | | | | | | |
| Electrode Gap (mil) | 2 | 2 | 2 | 2 | 10 | 2 | 2 | 2 |
| Device Resistance (ohm) | 1.2E + 12 | 8.8E + 13 | 3.9E + 12 | >333E + 12 | >20E + 06 | 6.7E + 07 | 2.4E + 12 | 5.7E + 06 |
| TLP RESULTS (2 kV Overstress Pulse) Clamp voltage (V) (from leading edge of pulse) | | | | | | | | |
| 25 ns | 100 | 70 | 77 | 84 | | 58 | 99 | 86 |
| 50 ns | 92 | 67 | 75 | 71 | | 57 | 86 | 77 |
| MZ RESULTS (8 kV Overstress Pulse) Clamp voltage (V) (from leading edge of pulse) | | | | | | | | |
| 25 ns | 78 | 69 | 72 | 91 | 510 | 34 | 45 | 72 |
| 50 ns | 68 | 61 | 59 | 74 | 495 | 27 | 43 | 58 |
| 100 ns | 55 | 48 | 47 | 57 | 460 | 25 | 39 | 45 |

| SAMPLE NOTEBOOK NUMBER | 109s15 | 109s34 | 109s35 | 109s60 | 109s60 | 109s60 | 109s62 | 109s26 | 123s69 |
|---|---|---|---|---|---|---|---|---|---|
| FORMULATION (Compositions Expressed in Volume Percentages) | | | | | | | | | |
| Nickel, Type 4SP-10 (Novamet, 4–8 micron range) | 30.0 | | 15.0 | 15.0 | 15.0 | 15.0 | 15.0 | | 42.0 |
| Nickel, 0.1 micron range (Conducting Materials Corporation) | | 15.0 | | | | | | | |
| Aluminum, 1–5 micron range (Atlantic Equipment Engineers) | | | | | | | | | |
| Nickel, Type 110, 1 micron range (Novamet) | | | | | | | | 15.0 | |
| Silicon Carbide (Norton, #10,000 grit) | | 40.0 | | | | | 30.0 | | 7.5 |
| Silicon Carbide (Agsco, #1200 grit) | 25.0 | | 30.0 | | | | | 25.0 | |
| Barium Titanate, 0.5–3 micron range (Atlantic Equipment Engineers) | | | 10.0 | 40.0 | | 40.0 | | | |
| Titanium Dioxide, 35 nm range (Nanophase Technologies) | 15.0 | | | | | | | | 4.0 |
| Magnesium Oxide, 1–5 micron range (Atlantic Equipment Engineers) | | | | | | | 10.0 | | |
| Zinc Oxide, 1–5 micron range (Atlantic Equipment Engineers) | | | | | | | | | 7.5 |
| Boron Nitride, 5–10 micron range (Combat) | | | | | | | | | |

-continued

| | | | | | | | | | |
|---|---|---|---|---|---|---|---|---|---|
| Binder: | | | | | | | | | |
| STI Q4-2901 (Dow Corning STI) | 30.0 | 45.0 | 45.0 | 45.0 | 45.0 | 45.0 | 45.0 | 60.0 | 39.0 |
| GE SLA7401-D1 (General Electric) | | | | | | | | | |
| ELECTRICAL PERFORMANCE | | | | | | | | | |
| Electrode Gap (mil) | 2 | 2 | 2 | 2 | 4 | 10 | 2 | 2 | 2 |
| Device Resistance (ohm) | 2.7E + 08 | 1.8E + 06 | 1.4E + 06 | 1.8E + 07 | >334E + 12 | 2.7E + 12 | 2.1E + 06 | 7.0E + 06 | >334E + 12 |
| TLP RESULTS (2 kV Overstress Pulse) Clamp voltage (V) (from leading edge of pulse) | | | | | | | | | |
| 25 ns | 88 | 81 | 85 | 54 | 208 | 1950 | 96 | 73 | 150 |
| 50 ns | 77 | 75 | 82 | 72 | 192 | 1980 | 94 | 69 | 130 |
| MZ RESULTS (8 kV Overstress Pulse) Clamp voltage (V) (from leading edge of pulse) | | | | | | | | | |
| 25 ns | 54 | 65 | 64 | 46 | 137 | 178 | 64 | 52 | 113 |
| 50 ns | 52 | 48 | 55 | 39 | 121 | 158 | 58 | 46 | 92 |
| 100 ns | 44 | 44 | 39 | 34 | 95 | 127 | 53 | 38 | 69 |

It can be seen from Examples 109s60 in Table 1 that the electrical performance of EOS devices can be tailored by the choice of gap width. For example, the clamping voltage of formulation can be increased by increasing the electrode gap spacing. In this case the performance also is modified so that the TLP voltage threshold (level required to switch the device to its on-state) is now at least 2000 V. These types of variations are useful for higher clamping voltage and/or higher energy applications.

While the specific embodiments have been illustrated and described, numerous modifications come to mind without significantly departing from the spirit of the invention and the scope of protection is only limited by the scope of the accompanying claims.

We claim:

1. A composition for providing protection against electrical overstress, the composition comprising:

an insulating binder;

conductive particles having an average particle size of less than 10 microns, said conductive particles being spaced by a distance of approximately 1000 angstroms or greater; and semiconductive particles having an average particle size of less than 10 microns.

2. The composition of claim 1, wherein a volume percentage of the insulating binder is in the range of about 20–60%, a volume percentage of the conductive particles is in the range of about 5–50% and a volume percentage of the semiconductive particles is in the range of about 2–60%.

3. The composition of claim 1, wherein the insulating binder comprises a material selected from the group consisting of thermoset polymers, thermoplastic polymers, elastomers, rubbers, or polymer blends.

4. The composition of claim 1, wherein the insulating binder is cross-linked.

5. The composition of 1 wherein the insulating binder comprises a silicone resin.

6. The composition of claim 5, wherein the silicone is cross-linked with a peroxide curing agent.

7. The composition of claim 1, wherein the conductive particles comprise a material selected from the group consisting of nickel, carbon black, aluminum, silver, gold, copper and graphite, zinc, iron, stainless steel, tin, brass, and alloys thereof.

8. The composition of claim 1, wherein the semiconductive particles comprise a material selected from the group consisting of oxides of bismuth, zinc, calcium, vanadium, iron, copper, magnesium and titanium; carbides of silicon, aluminum, chromium, molybdenum, titanium, beryllium, boron, tungsten and vanadium; nitrides of silicon, aluminum, beryllium, boron, tungsten and vanadium; sulfides of cadmium, zinc, lead, molybdenum and silver; titanates of barium and iron; borides of chromium, molybdenum, niobium and tungsten; and suicides of molybdenum and chromium.

9. The composition of claim 1, wherein the semiconductive particles comprise silicon carbide.

10. The composition of claim 1, wherein the composition has a clamping voltage of less than 100 volts.

11. The composition of claim 1, wherein the composition has a clamping voltage of less than 50 volts.

12. The composition of claim 1, wherein the semiconductive particles are comprised of a first and a second semiconductive material, the first semiconductive material being different from the second semiconductive material.

13. The composition of claim 12, wherein the semiconductive particles comprised of the first semiconductive material have an average particle size in the micron range and the semiconductive particles comprised of the second semiconductive material have an average particle size in the submicron range.

14. The composition of claim 1, wherein the conductive particles have a bulk conductivity greater than 10 $(\text{ohm-cm})^{-1}$.

15. The composition of claim 1, wherein the semiconductive particles have a bulk conductivity in a range of 10 to $10^{-6}$ $(\text{ohm-cm})^{-1}$.

16. A device for protecting a circuit against electrical overstress, the device comprising the composition of claim 1.

17. A composition for providing protection against electrical overstress, the composition comprising:

an insulative binder;

conductive particles having an average particle size of less than 10 microns;

semiconductive particles having an average particle size of less than 10 microns; and insulative particles having an average particle size in a range of about 200 angstroms to about 1,000 angstroms.

18. The composition of claim 17, wherein the insulative particles comprise a material selected from the group consisting of oxides of iron, titanium, aluminum, zinc and copper.

19. The composition of claim 17, wherein the insulative particles comprise clay.

20. The composition of claim 17, wherein the composition has a clamping voltage of less than 100 volts.

21. The composition of claim 17, wherein the composition has a clamping voltage of less than 50 volts.

22. The composition of claim 17, wherein the conductive particles have an average particle size in a range of about 4 to about 8 microns.

23. The composition of claim 17, wherein the conductive particles have an average particle size less than 4 microns.

24. The composition of claim 17, wherein the semiconductive particles have an average particle size less than 5 microns.

25. The composition of claim 17, wherein the insulative particles have a bulk conductivity of less than $10^{-6}$ (ohm-cm)$^{-1}$.

26. A device for protecting against electrical overstress, the device comprising a pair of electrodes electrically connected by a composition, the composition comprising:

an insulating binder;

conductive particles having an average particle size of less than 10 microns and a bulk conductivity of greater than 10 (ohm cm)$^{-1}$; and semiconductive particles having an average particle size of less than 10 microns and a bulk conductivity in a range of 10 to $10^{-6}$ (ohm cm)$^{-1}$.

27. A device for protecting against electrical overstress, the device comprising a pair of electrodes electrically connected by a composition, the composition comprising:

an insulating binder;

conductive particles having an average particle size of less than 10 microns and a bulk conductivity of greater than 10 (ohm cm)$^{-1}$;

semiconductive particles having an average particle size of less than 10 microns and a bulk conductivity in a range of 10 to $10^{-6}$ (ohm cm)$^{-1}$; and insulative particles having an average particle size in a range of about 200 angstroms to about 1,000 angstroms and a bulk conductivity less than $10^{-6}$ (ohm cm)$^{-1}$.

* * * * *